(12) United States Patent
Totzke (10) Patent No.: US 9,966,089 B2
(45) Date of Patent: *May 8, 2018

(54) SYSTEM AND METHOD OF IMPROVING COMMUNICATION IN A SPEECH COMMUNICATION SYSTEM (71) Applicant: Unify GmbH & Co. KG, Munich (DE)

(72) Inventor: Jurgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/457,227

(22) Filed: Mar. 13, 2017

(65) Prior Publication Data

US 2017/0186443 A1 Jun. 29, 2017

Related U.S. Application Data (63) Continuation of application No. 14/799,689, filed on Jul. 15, 2015, now Pat. No. 9,633,668, which is a
(Continued)

(51) Int. Cl.
*G10L 15/26* (2006.01)
*G10L 21/10* (2013.01)
(Continued)

(52) U.S. Cl.
CPC .......... *G10L 21/10* (2013.01); *G06F 3/0482* (2013.01); *G06F 3/04812* (2013.01);
(Continued)

(58) Field of Classification Search
CPC ... G10L 15/26; G10L 15/265; G10L 15/1815; G10L 15/1822
(Continued)

(56) References Cited

U.S. PATENT DOCUMENTS 8,572,075 B1 * 10/2013 Zatsman ........... G06F 17/30864
707/723
2006/0129455 A1 * 6/2006 Shah ...................... G06Q 30/02
705/14.54
(Continued)

FOREIGN PATENT DOCUMENTS

EP 1462950 A1 * 9/2004 ......... G06F 17/2715

Primary Examiner — Forrest F Tzeng
(74) Attorney, Agent, or Firm — Buchanan Ingersoll & Rooney PC (57) ABSTRACT A speech communication system and a method of improving communication in such a speech communication system between at least a first user and a second user may be configured so the system (a) transcribes a recorded portion of a speech communication between the at least first and second user to form a transcribed portion, (b) selects and marks at least one of the words of the transcribed portion which is considered to be a keyword of the speech communication, (c) performs a search for each keyword and produces at least one definition for each keyword, (d) calculates a trustworthiness factor for each keyword, each trustworthiness factor indicating a calculated validity of the respective definition(s), and (e) displays the transcribed portion as well as each of the keywords together with the respective definition and the trustworthiness factor thereof to at least one of the first user and the second user.

20 Claims, 6 Drawing Sheets

Related U.S. Application Data continuation of application No. 13/912,368, filed on Jun. 7, 2013, now abandoned.

(51) Int. Cl.

| | | |
|---|---|---|
| *G10L 15/08* | (2006.01) | |
| *G06F 17/27* | (2006.01) | |
| *G06F 3/0481* | (2013.01) | |
| *G06F 3/0482* | (2013.01) | |
| *G10L 15/22* | (2006.01) | |
| *G10L 15/18* | (2013.01) | |

(52) U.S. Cl.
CPC ........ *G06F 17/273* (2013.01); *G06F 17/2735* (2013.01); *G06F 17/2785* (2013.01); *G10L 15/08* (2013.01); *G10L 15/22* (2013.01); *G10L 15/1815* (2013.01); *G10L 15/1822* (2013.01); *G10L 15/26* (2013.01); *G10L 15/265* (2013.01); *G10L 2015/088* (2013.01)

(58) Field of Classification Search
USPC ...... 704/9, 270, 251, 257, E15.001, E15.045
See application file for complete search history.

(56) References Cited

U.S. PATENT DOCUMENTS

| | | | |
|---|---|---|---|
| 2007/0214125 A1* | 9/2007 | Williams | G06F 17/30734 |
| 2008/0235018 A1* | 9/2008 | Eggen | G10L 15/26 |
| | | | 704/251 |
| 2009/0138296 A1 | 5/2009 | Geiger | |
| 2009/0259459 A1* | 10/2009 | Ceusters | G06F 17/2775 |
| | | | 704/9 |
| 2010/0036829 A1* | 2/2010 | Leyba | G06F 17/30684 |
| | | | 707/739 |
| 2010/0131899 A1 | 5/2010 | Hubert | |
| 2012/0166180 A1* | 6/2012 | Au | G06F 17/27 |
| | | | 704/9 |

* cited by examiner

SYSTEM AND METHOD OF IMPROVING COMMUNICATION IN A SPEECH COMMUNICATION SYSTEM

CROSS-REFERENCE TO RELATED APPLICATIONS

This application is a continuation application of U.S. patent application Ser. No. 14/799,689, which is a continuation application of U.S. patent application Ser. No. 13/912,368, filed on Jun. 7, 2013.

FIELD OF THE INVENTION

The present invention relates to a method of improving communication in a speech communication system between at least one first user and one second user. Furthermore, the present invention relates to a speech communication system for implementing such a method.

BACKGROUND OF THE INVENTION

Knowledge workers are expected to provide their expertise to many different projects within their company. In many cases this results in the fact that they are involved in various teams, which may also be virtual teams. They typically have to attend one teleconference or collaboration session after the other without really having enough time to prepare themselves completely for the current project context.

In other instances, the knowledge worker just relaxes between the previous telephone conference and the next one. Assume she or he is going to discuss in a telephone conference the new business opportunity from an emerging domain that she/he is not familiar with at all. Due to a lack of time she/he is not well-prepared. Nevertheless, it is important for her/him to show competences during the telephone conference in order to anticipate their participation in the project.

I have determined that it appears that knowledge workers have not yet enough support by the speech communication system they are using for facing such problems.

SUMMARY OF THE INVENTION

Consequently, it is an object of the present invention to provide a method and a speech communication system which provides a better support for knowledge workers in situations like the ones discussed above, whereby the communication process may be improved and the efficiency of the knowledge worker may be increased. Thus, the knowledge worker should receive a maximum of support from the system with a minimum of personal cognitive effort. The object is in other words to provide all the relevant information and context to the persons involved in such a communication process.

At present, during an on-going speech communication, knowledge workers may mainly apply an unstructured procedure for retrieving additional information, such as searching on the Internet or in certain information spaces or in e-mail archives. These data sources may be called data repositories in a generalizing manner. Consequently, the attention of the participants in such a speech communication may get heavily distracted from the main issue of this speech communication, namely the topic to be discussed. It is to be emphasized that the term "speech communication" is to be intended that it refers to any communication process where speech is a part of this process. Examples of such a speech communication are audio communications such as a telephone call or teleconference, or a video communication such as a video conference.

This problem is solved with a method of improving communication in a speech communication system according to claim 1, comprising the steps that the system:

a) transcribes a recorded portion of a speech communication between the at least first and second user to form a transcribed portion, b) selects and marks at least one of the words of the transcribed portion which is considered to be a keyword of the speech communication, c) performs a search for each keyword and produces at least one definition for each keyword, d) calculates a trustworthiness factor for each keyword, each trustworthiness factor indicating a calculated validity of the respective definition(s), and e) displays the transcribed portion as well as each of the keywords together with the respective definition and the trustworthiness factor thereof to at least one of the first user and the second user.

The term "portion of a speech communication" is to be understood such that also a complete speech communication may be considered and not only a part of it, as the use case may be.

According to a further aspect of the present invention, this problem can also be solved by a speech communication system according to claim 13, comprising the following functional entities:

a transcription unit for transcribing a recorded portion of a speech communication between the at least first and second user to form a transcribed portion, a marking unit for selecting and marking at least one of the words of the transcribed portion which is considered to be a keyword of the speech communication, a search unit for performing at least one search for each keyword and producing at least one definition for each keyword, a trustworthiness unit for calculating a trustworthiness factor for each keyword, each trustworthiness factor indicating a calculated validity of the respective definition(s), and a display unit for displaying the transcribed portion as well as each of the keywords together with the respective definition and the trustworthiness factor thereof to at least one of the first user and the second user.

Respective advantageous embodiments of the invention are subject-matter of the dependent claims.

Definitions of terms used with respect to this invention:

Similarity is defined as the semantic similarity, whereby a set of terms within term lists are evaluated on the likeness of their meaning/semantic content.

Ontology as defined for computer and information science formally represents knowledge within a domain. Ontologies provide a shared vocabulary, which can be used to model a domain with the type of objects and their properties and relations. Ontology organizes information as a form of knowledge representation about a domain. The Web Ontology Language (OWL) as defined by W3C is a family of knowledge representation languages for authoring ontologies.

Taxonomy applied to information science is a hierarchical structure of classified objects. A taxonomy can be regarded as a special, simplified ontology for which the relations of objects are hierarchical.

Sentiment Detection (also known as Sentiment Analysis or Opinion Mining) refers to the application of natural language processing, computational linguistics, and text analytics to identify and extract subjective information in source materials.

Embodiments of the invention may cover, among other things, the following aspects: While a user is in a telephone conference the user may activate the disclosed method and system. A window may pop up showing the real-time transcription of the spoken words. Nouns and terms are automatically detected and marked. With a background application structured and unstructured information from internal and external data sources may be searched and consolidated. If augmenting information can be provided out of these search results the text gets highlighted. On mouse-over the augmented information is displayed. Alternatively, high-lighting transcription text by the user activates this function manually.

Based on the search results, the grade of trustworthiness (i.e. veracity or validity) of the provided, consolidated information is estimated (i.e. calculated) and displayed applying technologies like semantic similarity (or semantic relatedness), whereby the likeness of terms in respect to their meaning/semantic content is determined, and sentiment is detected.

During a subsequent teleconference and collaboration session out of a series, augmented transcriptions from the previous sessions may be displayed in backward chronological order. While scrolling down, the user can rapidly remember the project context, her/his intended contributions, and facilitate consistent positioning to the ongoing discussion. If certain terms and references are from a domain with which the user is not familiar with, the user typically doesn't want to consume the time of the other domain experts. Thanks to this invention, highlighted terms provide you with definitions and context, e.g. on mouse-over. Highlighting may apply automatically, e.g. special terms which are typically outside the regular dictionary, or selected by other members of the collaboration team. Most frequent mentioned terms from the previous discussion or session series are presented in an automatically generated tag-cloud providing a flashlight on the problem space discussed.

The invention applies structured and unstructured search, and semantic similarity, to online transcription of a conference/collaboration session complemented with a trustworthiness indication to create a contextual communication experience. Furthermore, the disclosed embodiments allow for playback of augmented transcriptions from concluded sessions or ongoing series of conferencing/collaboration sessions.

Embodiments of the speech communication system and the corresponding method of this invention may comprise the following features. Communication systems comprise audio/video conference units for media mixing, recording, and streaming of media. The transcripting function transcribes the audio component of the media into a textual representation. Typically, the transcript contains errors that can be auto-corrected by applying a spell-checker function using a regular dictionary for the language in use. Remaining errors that could not be resolved will be matched against a domain specific dictionary/glossary. If the error can be resolved, the related information is retrieved and linked to the transcript. Otherwise, the term will be marked and high-lighted by the word spotting functional entity. Spotted words are then applied to a search at information spaces listed in a trusted information space directory. Items in this directory are accompanied with a trustworthiness factor related to the information space searched and the type of search applicable. The directory includes references to predefined information spaces that are applicable for structured or unstructured search, e.g. well-known information source like Wikipedia, or applying semantic search typically for information available in intranet or a data warehouse, or for unstructured search e.g. using an intra-/internet search engine. If there are multiple search results delivered, they have to be applied to a similarity check. Thereby, e.g. by means of available ontologies, related terms can be identified. For each most frequent similar hit the similarity factor will be raised. In case of no search hits for an item that is part of a taxonomy, the "father", "grandfather", . . . relation can be searched instead of the term for which the search failed. If there are search results on terms inferred from taxonomies, this is documented and a reducing taxonomy factor will be considered. Any search results entitled for display may be condensed (technology available e.g. for smartphone apps) or stripped such that they can be recognized within a moment. The trustworthiness factor may get deducted by (multiplying with) the similarity factor and by a taxonomy factor. The search results are associated with the individual determined trustworthiness factor and stored in the community thread glossary and linked to the session transcript. Based on the updated community thread glossary the tag cloud is recreated. Depending on a system-wide policy based on the number of retrievals by the communication thread community, the search result is also stored in the domain glossary. Finally, the user interface is updated.

As a further option, the auto-corrected transcript can be translated a specified language, e.g. to the standard language defined by the company.

As further enhancements, sentiment detection technologies can be applied to individual search results in order to apply a weight factor for the trustworthiness factor or value, i.e. the sentiment factors for: negative/ironic context, neutral context, positive context. Proposed default values may be 0.1, 0.9, and 1, respectively, for these contexts.

As a further option, search results on structured/unstructured search are examined in respect to reader's evaluation schemes and its grade may be used as another weight factor for the trustworthiness factor, i.e. the community evaluation factor: e.g. an evaluation "4 of 5 stars" results in a weight factor of 0.8.

The trustworthiness factor may get further deducted by (multiplying with) the sentiment factor and the community evaluation factor.

As a further option, the user can judge the trustworthiness of a selected item, e.g. using a move-over context menu and override the value. A significant number of average override-values from the community thread will be considered as an additional weight when the item is stored in the domain glossary.

As described above, there is an interrelation between the method and the system according to the invention. Therefore, it is apparent that features described in connection with the method may be present or even necessarily present also in the system, and vice versa, although this may not be mentioned explicitly.

Other objects, features and advantages of the invention(s) disclosed herein may become apparent from the following description(s) thereof.

BRIEF DESCRIPTION OF THE DRAWINGS

Reference will be made in detail to embodiments of the disclosure, non-limiting examples of which may be illustrated in the accompanying drawing figures (Figs). The figures are generally in the form of diagrams. Some elements in the figures may be exaggerated, others may be omitted, for illustrative clarity. Some figures may be in the form of diagrams. Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

DETAILED DESCRIPTION OF EXEMPLARY EMBODIMENTS

Various embodiments may be described to illustrate teachings of the invention, and should be construed as illustrative rather than limiting. It should be understood that it is not intended to limit the invention to these particular embodiments. It should be understood that some individual features of various embodiments may be combined in different ways than shown, with one another. There may be more than one invention described herein.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention(s) disclosed herein. It should be apparent to those skilled in the art that these invention(s) may be practiced without these specific details. Headings (typically in upper-case letters) may be provided as an aid to the reader, and should not be construed as limiting.

Any dimensions and materials or processes set forth herein should be considered to be approximate and exemplary, unless otherwise indicated.

Figure 1:
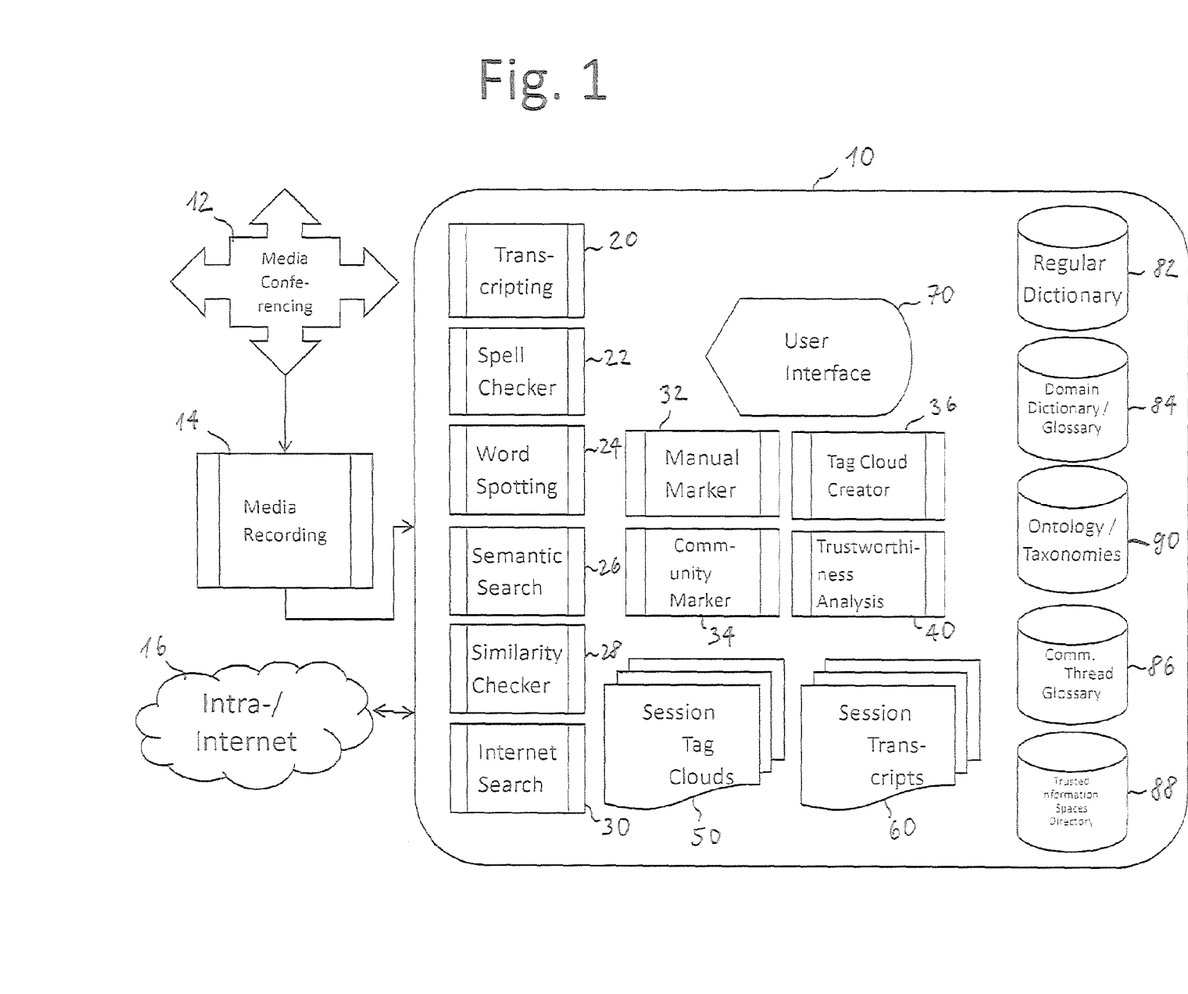
FIG. 1 is a diagram illustrating an exemplary speech communication system which may be suitable for implementing various embodiments of the invention.

FIG. 1 illustrates an exemplary speech communication system 10 (also abbreviated "system 10") which comprises several functional entities. These entities may be designed as distinct units linked with each other or with a processing unit such as a central processing unit ("CPU"), interconnected processors, a microprocessor, or other type of processor, or they may be for example tasks carried out by a CPU or other type of processor. Furthermore, it is possible that these entities are a mixture of these configurations. Item 12 indicates that the speech communication system 10 is related to media conferencing. A media recording unit 14 is part of the media conferencing 12 and is connected with the speech communication system 10. A cloud 16 indicates that the speech communication system 10 is connected with intranet and/or Internet. It should be appreciated that embodiments of the communication system 10 may include a computer, a server, a media conference server, a laptop computer, or a mobile computer device such as a smart phone or internet appliance or tablet. The system may include hardware elements such as a display (e.g. a liquid crystal display, a touch actuatable display, a monitor), non-transitory memory (e.g. a hard drive, flash memory, etc.), and input devices (e.g. a keyboard, touch sensitive display screen, mouse, scanner, reader, etc.) that are communicatively connected to a processing unit (e.g. a central processing unit, at least one processor, interconnected processors, etc.).

The speech communication system 10 may comprise a transcripting unit 20, a spell-checker unit 22, a word highlighting or word spotting unit 24, a semantic search unit 26, a similarity checker unit 28, and an internet search unit 30. Furthermore, the speech communication system 10 can comprise a marker unit 32 for manual marking and a marking unit 34 for community marking of certain words. Furthermore, a tag cloud creator 36 may be included. A display 50 for displaying session tag clouds and a display 60 for displaying session transcripts may be provided as well. Furthermore, the system 10 includes a data storage 82 for a regular dictionary (or several regular dictionaries), a data storage 84 for a domain dictionary (which may also be called a glossary), a data storage 86 for one or several communication threads created during the speech communication, and a data storage 88 for storing a directory of trusted information spaces. The system 10 may as well include a data storage 90 for dealing with ontologies and taxonomies. It goes without saying that in an alternative embodiment at least some of the data storages 82-90 or other entities mentioned before may be located outside the system 10 and linked or connected with the system 10.

Figure 2:
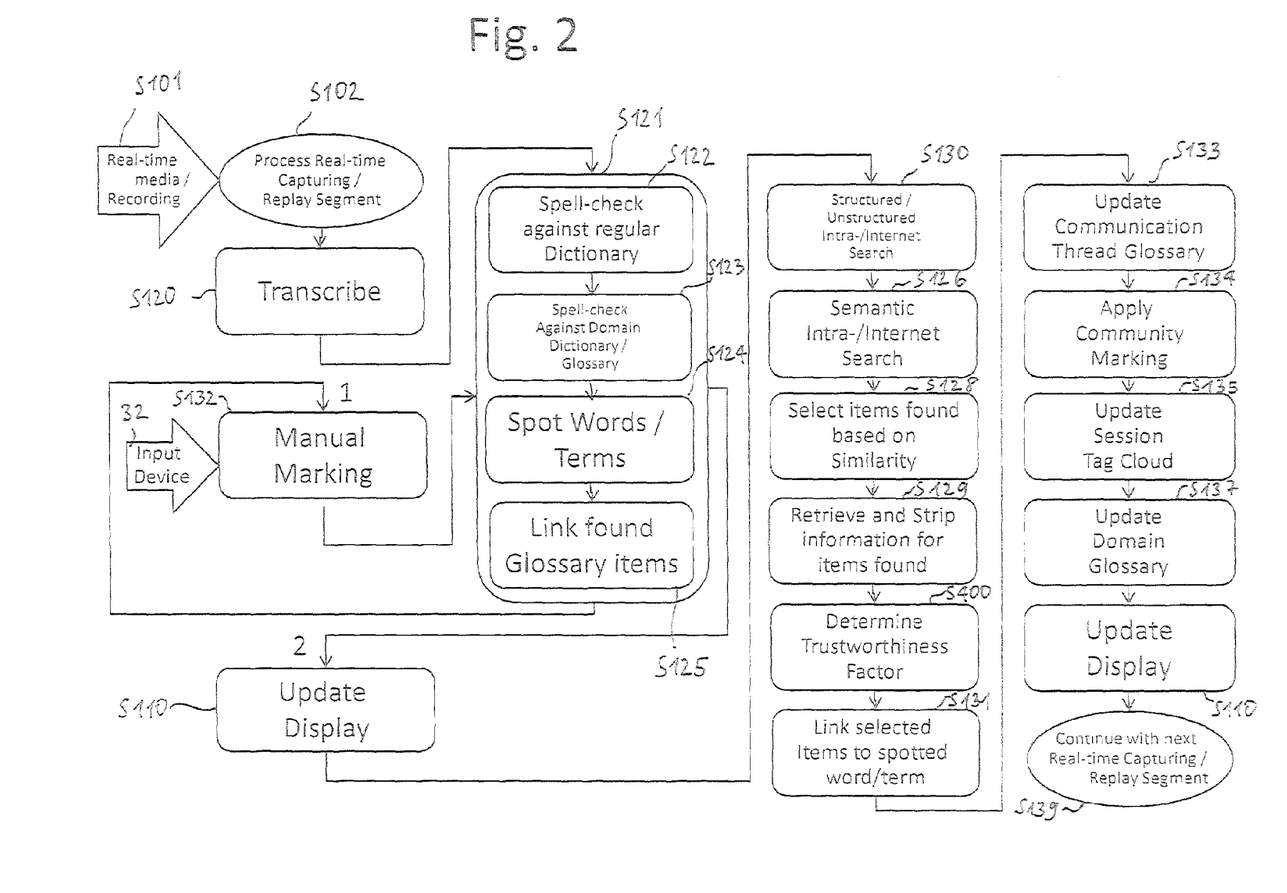
FIG. 2 is a diagram showing a sequence of steps and events which may occur or be present in an exemplary method of improving communication in a speech communication system.

The specific functions of the above-mentioned functional entities and their respective connections/connectivities as well as the overall function of the speech communication system 10 may be better understood from the explanation of an embodiment of the method of improving communication in a speech communication system 10 as depicted in FIG. 2.

As shown in FIG. 2, in a step S101 a real-time media stream or a corresponding recording is accessed to be processed in a step S102, wherein either real-time recorded speech data or replayed segments of speech data are used. In a following step S120 these data are transcribed in order to create a transcribed portion. In this example, the method is carried out sequentially on respective segments of speech data. As an alternative, the method may be carried out continuously on speech data as well. In a step S122 a spell-check of the transcribed portion against a regular dictionary stored in a data storage 82 is carried out in the spell-checker unit 22. The spell-checked transcribed portion forms a so-called communication thread.

The speech data are generated in this example in a telephone call between a first user and a second user. It is clear that the speech data may also stem from a telephone conference between more than just two users or that these speech data result from a video conference.

Thereafter, the spell-checker unit 22 carries out a spell-check against a domain dictionary or domain glossary stored in a data storage 84 which contains terms frequently used in a certain domain or community. Thereafter, in a step S124 the selecting unit or word spotting unit 24 spots words and terms which may be keywords of the communication thread.

In a step S125, the found glossary items are linked to the respective keywords. The steps S122, S123, S124, and S125 may be regarded as a combined step S121.

After performing this combined step S121 for the first time, the method gives a users the possibility to manually mark in a step S132 words of the communication thread by using an input device in the form of a manual marking unit 32 (which typically may be a computer mouse) in order to indicate that the respective word is regarded as a keyword. The fact that this possibility is open to the user is indicated by the number "1" at the arrow pointing to the manual marking step S132. After step S132, the combined step S121 is carried out once again for the manually marked word or words. After the conclusion of the combined step S121 for the second time, the display on which the results of the steps carried out so far are shown is updated in a step S110, as indicated by the number "2" at the arrow pointing to step S110.

In a step S130, the internet search unit 30 performs a structured and/or an unstructured intranet or internet search in order to be able to produce at least one definition for each of the keywords. It may happen that by step S130 just one "correct" definition for a respective keyword is found or produced, respectively, and it may well happen that several different definitions are generated. In a step S126, the semantic search unit 26 performs a semantic intranet and/or internet search for refining or correcting the search results of step 130. In a step 128 performed thereafter, the similarity checker unit 28 selects items found on the basis of similarity. In a step S129, for the items found, information is retrieved and stripped for unnecessary portions.

In a step S400, the trustworthiness analysis unit 40 determines or calculates, respectively, a trustworthiness factor (thereafter partly abbreviated with TWF) which indicates their reliability/veracity/validity of the definition or definitions generated so far. Then, in a step S131 the selected items are linked to the spotted words and terms. In a step S133, the glossary containing the communication thread is updated, i.e. the "new" keywords are added to the communication thread glossary (which is stored in the data storage 86). In a step S134, the manual markings of the other users not yet considered in the description of the invention so far are taken into account. In other words, the result of the marking, selecting and determining of the TWF of those other users is also taken into account. In a step S135, the cloud of the session tags shown on the respective display unit 50 is updated. In a step S137, the domain glossary stored in the data storage 84 is updated. Finally, in a further step S110, the display showing the information produced so far is updated again. At this point in time, the method of the invention continues with the next real-time capturing segment or with the next real-time replay segment, as the case may be. It is of course also possible to apply this invention to segments which are not recorded in real-time. This step may be called a step S139.

Figure 3:
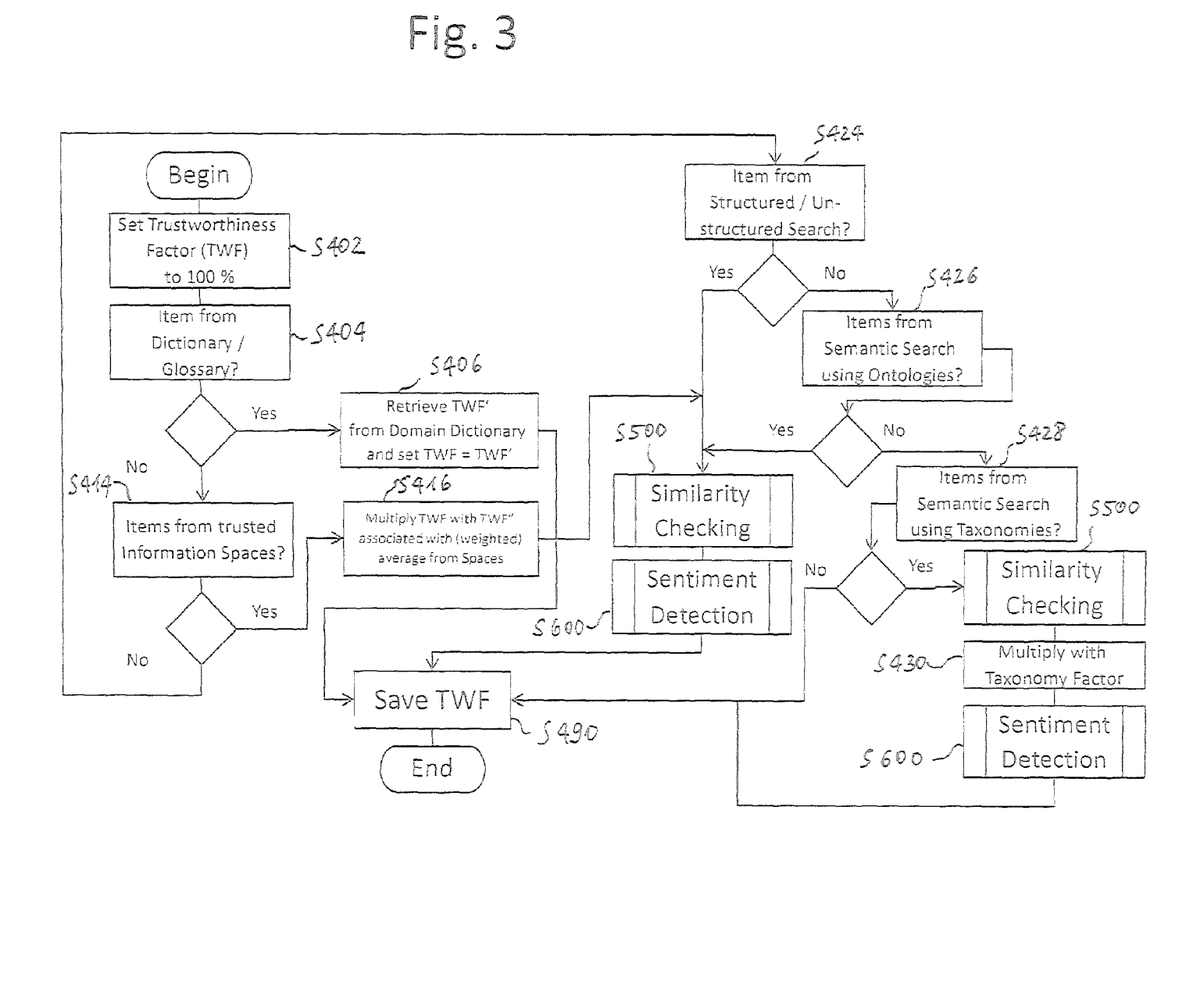
FIG. 3 is a diagram showing in more detail a sequence of steps and events which may occur or be present in the step of determination of the trustworthiness factor.

In FIG. 3, details of the trustworthiness factor determining step S400 are shown. In a step S402, the trustworthiness factor is set to 100%, or 1, respectively. In a step S404, it is checked whether the respective item was found in a dictionary or glossary. If this is the case, the respective trustworthiness factor TWF' from the domain dictionary is retrieved, and this TWF' replaces the former TWF. Thereafter, in a step S490 this TWF is saved (in connection with the respective item from the dictionary/glossary).

In case the step S404 reveals that the respective item was not found in a dictionary/glossary, in a step S414 it is checked whether the items stem from trusted information spaces such as e.g. Wikipedia. If this is the case, in a step S416 the TWF is multiplied with a TWF" which is associated with a (weighted) average from the respective information spaces. Afterwards, in step S500 a similarity check is performed, and then a sentiment detection is carried out in a step S600. Details with respect to the steps S500 and S600 may be found in connection with the description of the FIGS. 4 and 5, respectively. Finally, in the step S490 the calculated TWF is saved.

In case the step S414 reveals that the items are not from trusted information spaces, in a step S424 it is checked whether the items result from a structured or unstructured search. If this is the case, the steps S500 of similarity checking and S600 of sentiment detection are carried out, and in the subsequent step S490 the respective TWF is saved.

If the step S424 reveals that the items are not from a structured/unstructured search, in a step S426 it is checked whether the items stem from a semantic search using ontologies. If this is the case, again, the steps S500 of similarity checking and S600 of sentiment detection are carried out, and finally the TWF is saved in the step S490.

In case the step S426 reveals that the items are not from a semantic search using ontologies, it is checked in a step S428 whether the items are from a semantic search using taxonomies. If the answer to this check is "no", the respective TWF is saved in the step S490. In case the answer to this check is "yes", the similarity checking step S500 is carried out. Thereafter, in a step S430 the present TWF is multiplied with a taxonomy factor. In other words, in case there are no search hits for an item that is part of a taxonomy, the "father", "grandfather", relation can be searched instead of the term for which the search failed. If there are search results on terms inferred from taxonomies, this is documented and a reducing taxonomy factor will be applied to the TWF. This taxonomy factor may result in a reduction of the TWF. The taxonomy factor represents the "distance" in the hierarchy between two terms, and it is e.g. for the father 75%, for the grandfather 50%, for the grand-grandfather 25%, and for the brother 85%. After that, the sentiment detection step S600 is carried out, and the respective TWF is saved in the step S490.

Figure 4:
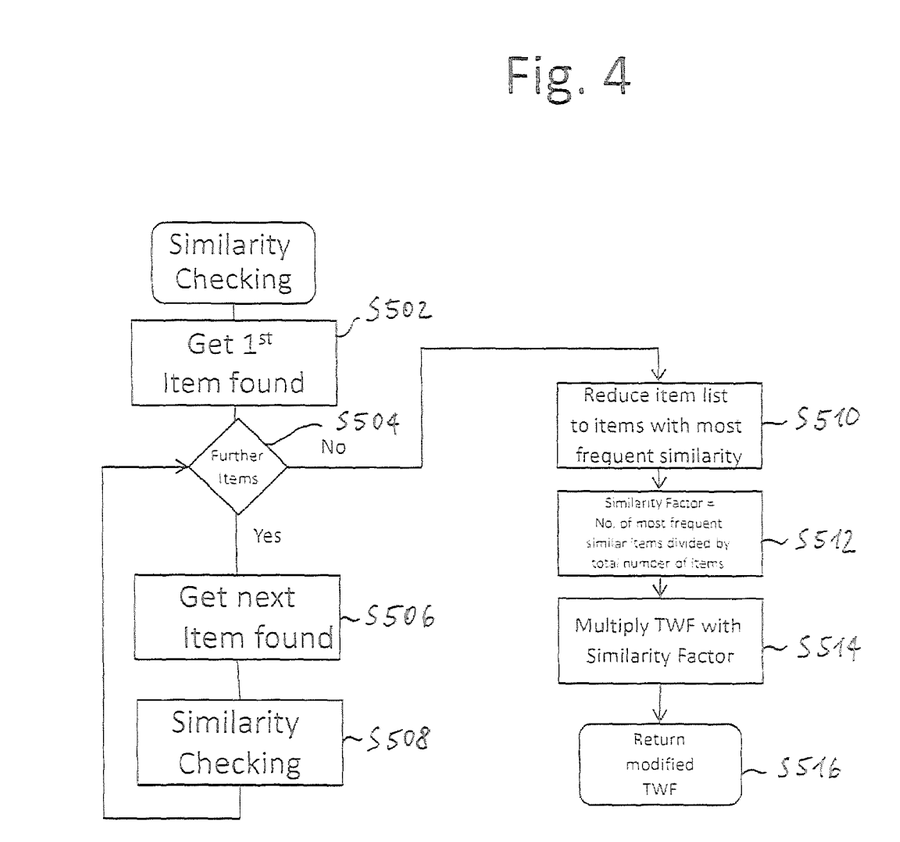
FIG. 4 is a diagram showing a sequence of steps and events which may occur or be present in an exemplary method of similarity checking as a part of the determination of the trustworthiness factor.

In FIG. 4 the process of similarity checking, which was summarized as one single step S500 in the previous discussion, is explained in detail. In a step S502, the first item found is latched in a buffer. In a subsequent step S504 it is checked, whether there are further similar items. In case there are further similar items, in a step S506 the next item found is latched in a buffer and compared in a step S508 with the previous item in order to perform a similarity checking. To give an example, SML (=Semantic Measures Library) and a respective toolkit can be used to compute semantic similarity between semantic elements/terms. The steps S506 and S508 are carried out for each further item found. As soon as there are no further items, in a step S510 the item list is reduced to those items with the most frequent similarity. In a subsequent step S512 a similarity factor is calculated which is the number of the most frequent similar items divided by the total number of items. In a subsequent step S514 the current TWF is multiplied with the similarity factor calculated in step S512. In a step S516 this modified TWF (which is the most current TWF) is returned.

Figure 5:
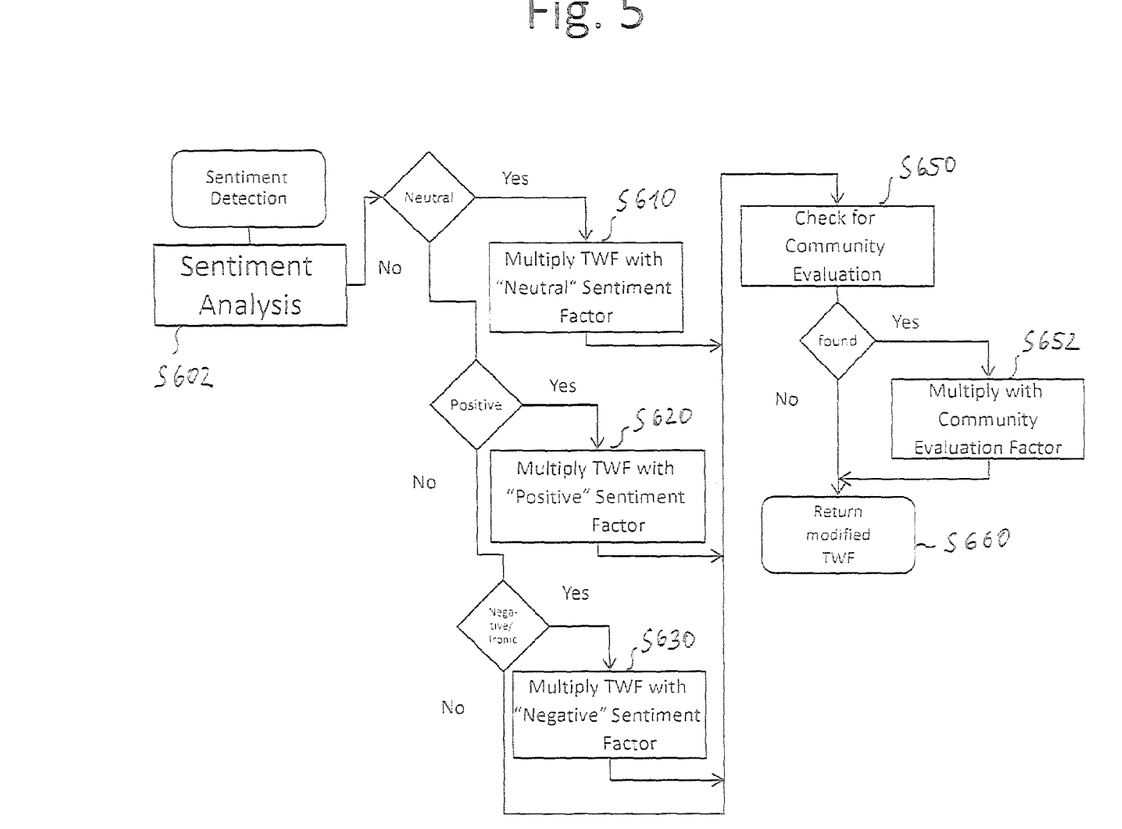
FIG. 5 is a diagram showing a sequence of steps and events which may occur or be present in an exemplary method of sentiment detection which may be a part of determination of the trustworthiness factor.

FIG. 5 explains how the sentiment detection step S600 is carried out, which was summarized as one single step S600 in the discussion above. In a step S602 a sentiment analysis is performed in order to find out whether in the definition or definitions found so far for the keywords any sentiment is included. Examples for the sentiment may be negative or ironic, positive, or neutral. In other words, the sentiment detection reveals whether one of the users has a personal assessment or appreciation of a certain word or term which is manifested in the respective communication thread. In case the sentiment analysis in step S602 reveals that there is a neutral sentiment, the current TWF is multiplied with a "neutral" sentiment factor in a step S610.

Afterwards, in a step S650, a check for community evaluation is performed. If it is found that the community, i.e. other readers, have given an evaluation, a community evaluation factor is calculated and multiplied with the TWF found so far. If for example the community gives a ranking of 80% for a certain definition of a keyword, the community evaluation factor, which is a weight factor, would result in a number of 0.8. This calculation and multiplication is carried out in a step S652. Afterwards, the modified TWF is returned in a step S660. In case no community evaluation can be found, the modified TWF is returned "directly" without any multiplication with a community evaluation factor in step S660.

In case the sentiment analysis in step S602 reveals that there is a positive sentiment, the current TWF is multiplied with a "positive" sentiment factor in a step S620. Then, the steps S650-S660 are carried out. If, however, the sentiment analysis in step S602 reveals that there is a negative or ironic sentiment, the current TWF is multiplied with a "negative" sentiment factor in a step S630. Then, the steps S650-S660 are carried out. In case in the sentiment analysis in step S602 no sentiment at all is found, the steps S650-S660 are carried out without any multiplication of the TWF with a sentiment factor.

Just to give an example, the sentiment factor may have a value of 0.1 for a negative or an ironic, a value of 0.9 for a neutral, and a value of 1 for a positive sentiment.

Figure 6:
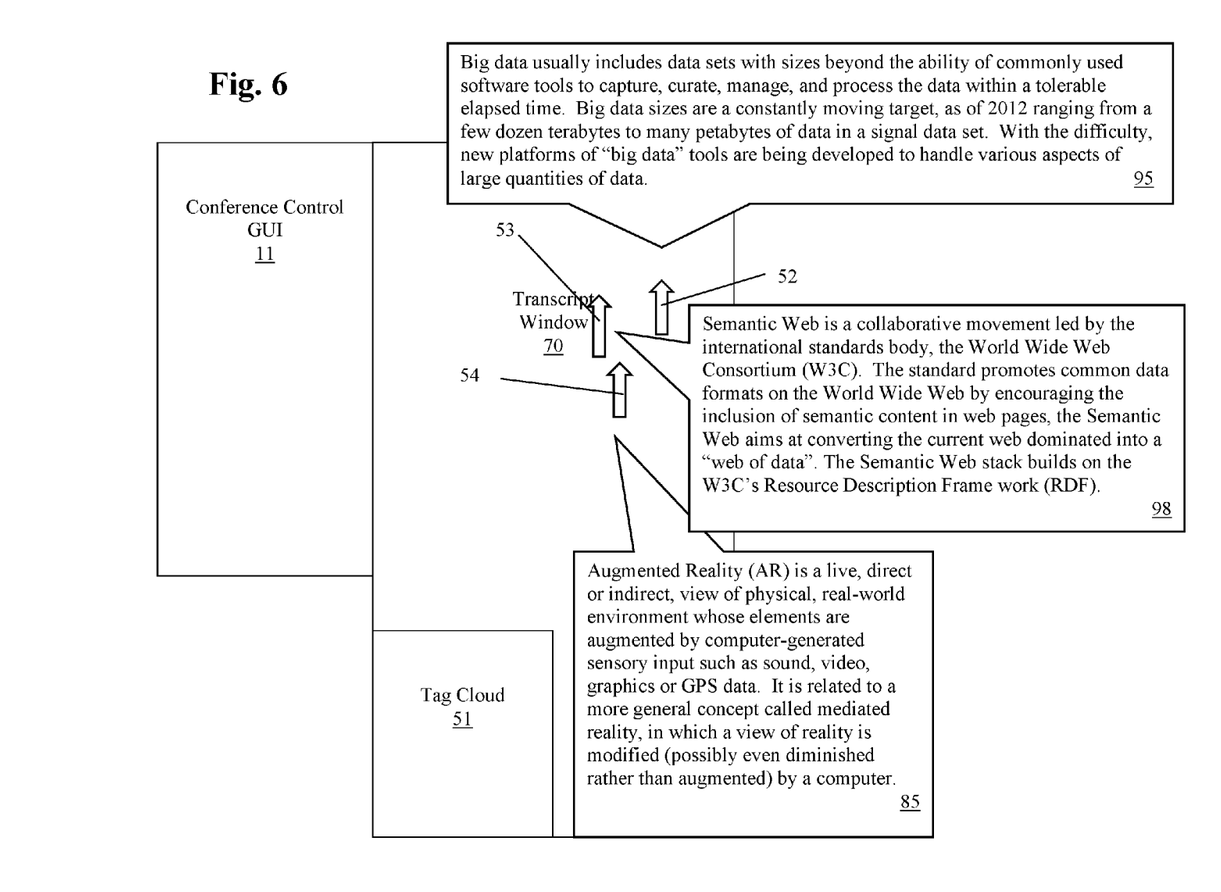
FIG. 6 is a diagram which shows in an exemplary manner some components of the speech communication system, including a display, on which a transcript window is shown and on which several keywords together with their definition and the corresponding trustworthiness factor are shown.

Finally, the respective displays (e.g. user interfaces shown via a display unit such as a liquid crystal display or monitor), like the user interface 70, are updated. That means that a series of updated information is displayed via a display unit. One example for this display is given in FIG. 6. This view illustrates the way a user experiences the present speech communication system 10 and the corresponding method carried out by the system 10. On a transcript window corresponding to a user interface 70, a tag cloud is displayed which is schematically and generally referenced with the numeral 51. Three specific tags are shown here as random examples: The tag 52 refers to "big data", the tag 53 refers to "semantic web", and the tag 54 is directed to "augmented reality". In the respective "stars" in the tags 52 to 54, the corresponding trustworthiness factors are displayed. In other words, the keyword "big data" has a TWF of 95, the keyword "semantic web" has a TWF of 98, and "augmented reality" has a TWF of only 85. One portion of the display is a conference control graphical user interface which is referenced with the numeral 11. It goes without saying that the display may be updated at any step or at any point in time considered to be useful for the process.

It may well be contemplated to give certain privileges to specified users, e.g. different user rights, in order to allow for overriding the trustworthiness factor.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. A method of improving communication in a speech communication system between at least a first user and a second user, the speech communication system comprising at least one processor communicatively connected to non-transitory memory, the method comprising:
   a) transcribing, by the system, a recorded portion of a speech communication between the at least first and second user to form a transcribed portion,
   b) selecting and marking, by the system, at least one of the words of the transcribed portion which is considered to be a keyword of the speech communication,
   c) performing, by the system, a search for each keyword and produces at least one definition for each keyword that identifies a meaning of that keyword,
   d) calculating, by the system, a trustworthiness factor for each keyword, each trustworthiness factor indicating a calculated validity of a respective definition for a respective keyword; and
   e) displaying, by the system, the transcribed portion such that, in response to a pointer being positioned over at least one keyword of the displayed transcribed portion or selection of at least one displayed keyword, displaying the at least one definition of the keyword together with the calculated trustworthiness factor for each displayed definition is actuated.

2. The method of claim 1, wherein each definition is a generated dictionary definition and wherein the system calculating the trustworthiness factor for each keyword comprises:
   the system performing:
      a semantic search using taxonomies in order to generate a taxonomy correction factor for determining the trustworthiness factor for each definition;
      a similarity checking which takes into account similarity of different definitions for each keyword in order to generate a similarity correction factor for determining the trustworthiness factor for each definition; and
      a sentiment detection which takes into account sentiment with respect to a definition for each keyword to generate a sentiment correction factor for determining the trustworthiness factor for that definition; and
determining the trustworthiness factor for each definition based on the taxonomy correction factor, the similarity correction factor, and the sentiment correction factor for that keyword; and
wherein the system performing the search for each keyword comprises:
the system communicating with at least one information space communicatively connected to the system via at least one network connection to identify at least one definition for each keyword for producing a definition for that keyword.

3. The method of claim 1, comprising:
performing a spell-check of the transcribed portion using at least one regular glossary and/or at least one domain glossary.

4. The method of claim 1, wherein:
step b) comprises an automatic selecting of the keywords by the system and manually selecting of the keywords by a user and/or by a community of users using the system.

5. The method of claim 1, wherein:
step c) comprises a search in a structured and/or in an unstructured data repository.

6. The method of claim 1, wherein:
step d) comprises the system performing a semantic search using ontologies.

7. The method of claim 1, wherein:
step d) comprises the system performing a semantic search using taxonomies in order to generate a taxonomy correction factor for modifying the trustworthiness factor.

8. The method of claim 1, wherein:
step d) comprises the system carrying out similarity checking which takes into account similarity of different definitions of a respective keyword in order to generate a similarity correction factor for modifying the trustworthiness factor.

9. The method of claim 1, wherein:
step d) comprises the system carrying out sentiment detection which takes into account the sentiment with respect to at least one definition of at least one keyword in order to generate a sentiment correction factor for modifying the trustworthiness factor.

10. The method of claim 1, wherein the speech communication results in a communication thread and wherein a glossary of the communication thread is created and regularly updated.

11. A non-transitory tangible computer-readable medium comprising a computer program that defines a method that is performed by a communication system when a processor unit of the system runs the program, the method comprising:
a) transcribing, by the system, a recorded portion of a speech communication between the at least first and second user to form a transcribed portion,
b) selecting and marking, by the system, at least one of the words of the transcribed portion which is considered to be a keyword of the speech communication,
c) performing, by the system, a search for each keyword and produces at least one definition for each keyword that identifies a meaning of that keyword,
d) calculating, by the system, a trustworthiness factor for each keyword, each trustworthiness factor indicating a calculated validity of a respective definition for a respective keyword; and
e) displaying, by the system, the transcribed portion such that, in response to a pointer being positioned over at least one keyword of the displayed transcribed portion or selection of at least one displayed keyword, displaying the at least one definition of the keyword together with the calculated trustworthiness factor for each displayed definition is actuated.

12. A speech communication system comprising:
non-transitory memory;
a transcription unit, the transcription unit configured to transcribe a recorded portion of a speech communication between the at least first and second user stored in the memory to form a transcribed portion,
a selecting unit, the selecting unit configured to select and mark at least one of the words of the transcribed portion which is considered to be a keyword of the speech communication,
a search unit, the search unit configured to perform at least one search for each keyword and produce at least one definition for each keyword that identifies a meaning of that keyword,
a trustworthiness unit, the trustworthiness unit configured to calculate a trustworthiness factor for each keyword, each trustworthiness factor indicating a calculated validity of a respective definition for a respective keyword; and
a display unit, the display unit configured to display the transcribed portion such that, in response to a pointer being positioned over at least one keyword of the displayed transcribed portion or selection of at least one displayed keyword, displaying of the at least one definition of the keyword together with the calculated trustworthiness factor for each displayed definition is actuated.

13. The speech communication system of claim 12, further comprising:
a recording unit, the recording unit configured to record real-time speech communication.

14. The speech communication system of claim 13, further comprising:
a spell-check unit, the spell-check unit configured to spell check the transcribed portion using at least one of a regular domain glossary and a domain glossary.

15. The speech communication system of claim 12, wherein the selection unit is configured to automatically select at least one of the words based on one of the keywords and the system further comprising:
an input device configured such that a manual selecting of the keywords by at least one user is inputtable to the system.

16. The speech communication system of claim 12, wherein:
the search unit is also configured to search in a structured and/or in an unstructured data repository.

17. The speech communication system of claim 12, further comprising:
a semantic search unit, the semantic search unit configured to perform a semantic search using ontologies.

18. The speech communication system of claim 12, further comprising:
a semantic search unit, the semantic search unit configured to perform a semantic search using taxonomies in order to generate a taxonomy correction factor that is used to calculate the trustworthiness factor.

19. The speech communication system of claim 18, further comprising:
   a similarity check unit, the similarity check unit configured to carry out a similarity checking step which takes into account the similarity of various definitions of a respective keyword in order to generate a similarity correction factor that is used to calculate the trustworthiness factor.

20. The speech communication system of claim 19, further comprising:
   a sentiment check unit, the sentiment check unit configured to carry out sentiment detection that takes into account the sentiment with respect to at least one definition of at least one keyword in order to generate a sentiment correction factor that is used to calculate the trustworthiness factor.

\* \* \* \* \*